(12) United States Patent
Reichardt

(10) Patent No.: US 6,241,557 B1
(45) Date of Patent: Jun. 5, 2001

(54) SMART CARD CONNECTOR

(75) Inventor: Manfred Reichardt, Weinsberg (DE)

(73) Assignee: Amphenol-Tuchel Electronics GmbH (DE)

( * ) Notice: Subject to any disclaimer, the term of this patent is extended or adjusted under 35 U.S.C. 154(b) by 0 days.

(21) Appl. No.: 09/531,520

(22) Filed: Mar. 21, 2000

(30) Foreign Application Priority Data

Mar. 26, 1999 (DE) ............................................... 199 13 923

(51) Int. Cl.$^7$ .................................................. H01R 24/00
(52) U.S. Cl. ........................................ 439/637; 439/928.1
(58) Field of Search ........................... 439/64, 260, 76.1, 439/630, 637, 638, 945, 946.2, 928.1; 361/737, 684, 735, 729

(56) References Cited

U.S. PATENT DOCUMENTS

| 5,184,282 | * | 2/1993 | Kaneda et al. ........................ 361/395 |
| 5,559,672 | * | 9/1996 | Buras, Jr. et al. ................... 361/684 |
| 5,679,007 | * | 10/1997 | Potdevin et al. ..................... 439/76.1 |
| 5,901,049 | | 5/1999 | Schmidt et al. ...................... 361/787 |
| 6,075,706 | * | 6/2000 | Learmonth et al. ................. 361/737 |

FOREIGN PATENT DOCUMENTS

| 298 08 948 | 9/1998 | (DE) . |
| 0 845 837 | 6/1998 | (EP) . |

OTHER PUBLICATIONS

Abstract of European Patent EPO845837, Jun. 1998.

* cited by examiner

*Primary Examiner*—Tulsidas Patel
(74) *Attorney, Agent, or Firm*—Blank Rome Comisky & McCauley, LLP

(57) ABSTRACT

A smart card connector, in particular a SIM-card connector has a top portion supporting contact elements (30) and a bottom portion supporting contact elements (31) disposed in a spaced relationship to the top portion, said top portion (12) and said bottom portion (13) form a card slot (14) in which two smart cards, in particular SIM-cards can be inserted in such a manner that one card (27) faces with its card contacts (29) towards the contact portions of the contact elements (30) of the top portion whereas the other SIM-card (28) faces with its card contacts (290) towards the contact portions of the contact elements (31) of the bottom portion.

18 Claims, 2 Drawing Sheets

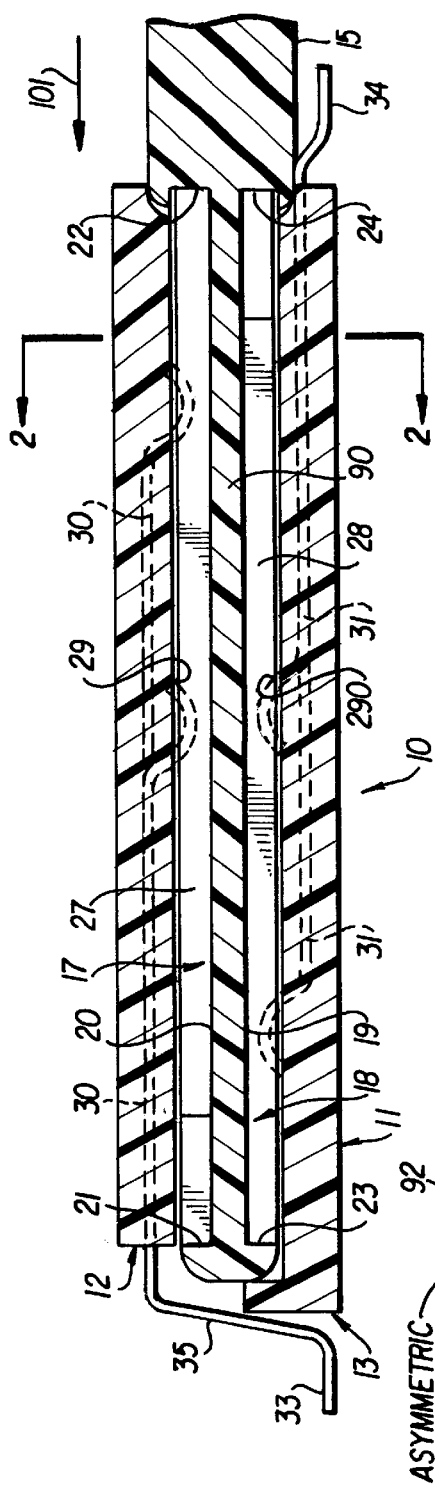
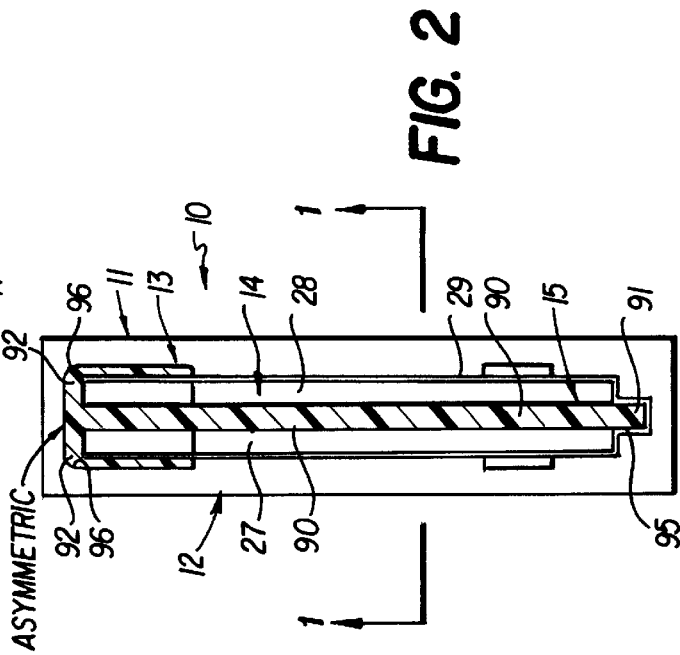
FIG. 1
FIG. 2

SMART CARD CONNECTOR

TECHNICAL FIELD

This invention relates generally to a connector and, more particularly to a connector for a smart card, in particular for a SIM-card. More specifically the present invention is related to a connector for two smart cards, in particular SIM-cards disposed one above the other. The smart card, in particular the SIM-card is occasionally referred to below as a "card".

BACKGROUND ART

Connectors which allow to contact several SIM-cards are known.

Known connectors waste a lot of space both regarding the height as well the width and the length of the connector because several connectors each for a single card are placed adjacent to one another. The present invention provides a connector, in particular for the use with two SIM-cards wherein particularly the longitudinal and transversal dimension of the connector is minimized.

Attention is drawn to EP 0 845 750 A2, EP 0 845 837 A2, and DE 29 808 948 U1.

Accordingly, the present invention is directed to overcoming one or more of the problems as set forth above.

DISCLOSURE OF THE INVENTION

In one aspect of the present invention a connector is provided which has a top portion and disposed in a spaced relationship thereto a bottom portion for forming a card insertion pocket or slot in such a way that it is particularly adapted for receiving two cards. The top portion and the bottom portion may be formed as one piece. In particular the top portion and the bottom portion may each form a single connector for each one card and may be placed on top of each other. In this case, the two single connectors may be glued together or fixed to each other by a snap-in connection.

In a second aspect of the present invention a connector is provided which has a housing which forms a card slot. A first group of contact springs in a first portion of the housing has contact portions which project into the card slot. A second portion of the housing has a second group of contact springs which project with their contact portions into the card slot in a direction opposite to the direction in which the contact portions of the first group of contact springs project into the card slot. The contact portions of the first group of contact springs are displaced in relation to the contact portions of the contact springs of the second group such that smart cards, in particular SIM-cards which have the same arrangement or pattern of card contacts are adapted to mate or contact with the respective contact portions of the first and second group of contacts supported by the housing when the cards are inserted rotated with respect to each other by 180° about a transverse axis.

The above and further advantages, objects and details of the invention will become apparent from the description of preferred embodiments with reference to the accompanying drawing.

BRIEF DESCRIPTION OF THE DRAWINGS

FIG. 1 is a schematic cross sectional view of an embodiment of a connector in accordance with the invention along line 1—1 in FIG. 2;

FIG. 2 is a schematic cross sectional view along line 2—2 of FIG. 1;

DESCRIPTION OF THE PREFERRED EMBODIMENT

Figure 3:
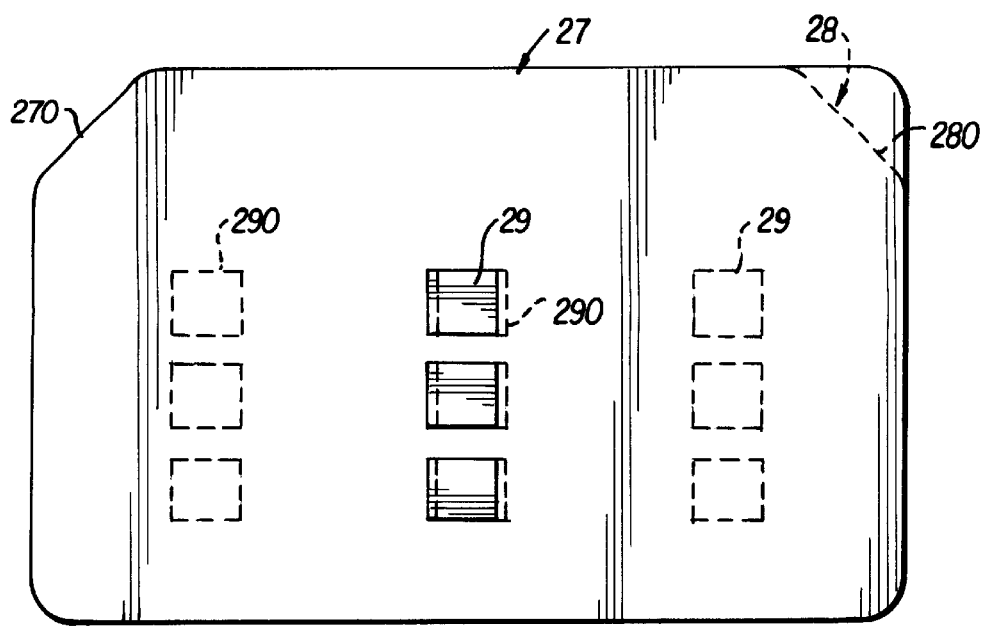
FIG. 3 is a top view of two SIM-cards (shown on top of each other) which may be inserted into the connector of the invention.

Referring to FIGS. 1 and 2 a SIM-card connector 10 is illustrated. In general, however, the present invention is also applicable to a smart card connector (also called a chip card connector). The dimensions or sizes of smart card connectors are not so critical as they are for a SIM-card connector. The SIM-card connector of the present invention requires little space on a circuit board or printed circuit board (PCB).

The SIM-card connector 10 comprises a contact support 11 and a carrier 15. The contact support 11 may be also referred to as a housing. The contact support 11 consists of a first or top portion 12 supporting contact elements or contact springs 30 and a second or bottom portion 13 supporting contact springs 31. As illustrated in FIG. 2 the top portion 12 and the bottom portion 13 may be formed as one piece and preferably they are made from plastic material. The top portion 12 and the bottom portion 13, however, may be separate parts formed separately from plastic material and may be connected such as by a snap-in connection of the top portion 12 and the bottom portion 13 to form the contact support 11. As illustrated, the top potion 12 and the bottom portion 13 are positioned in a spaced relationship from each other so as to form a card pocket or card slot 14. The respective contact springs 30, 31 project with their contacting ends or contact cusps into the card slot 14 when no SIM-card(s) 27, 28 is (are) inserted.

FIG. 3 shows both SIM-cards 27, 28 in a position in which they may be located in the card slot 14. The SIM-card 27 (also referred to as card 27) faces with it's card contact pads or card contacts 29 towards the contacting ends of the contact springs 30. The SIM-card 28 (also referred to as card 28) faces with it's card contacts 290 towards the contacting ends of the contact springs 31. The respective cards 27, 28 each have a polarization chamfer 270, 280 to insure their correct orientation in the contact support 11.

In accordance with the invention the cards 27, 28 are preferably inserted into the card slot 14 by means of the carrier 15 which preferably has the form of a drawer.

Figure 4:
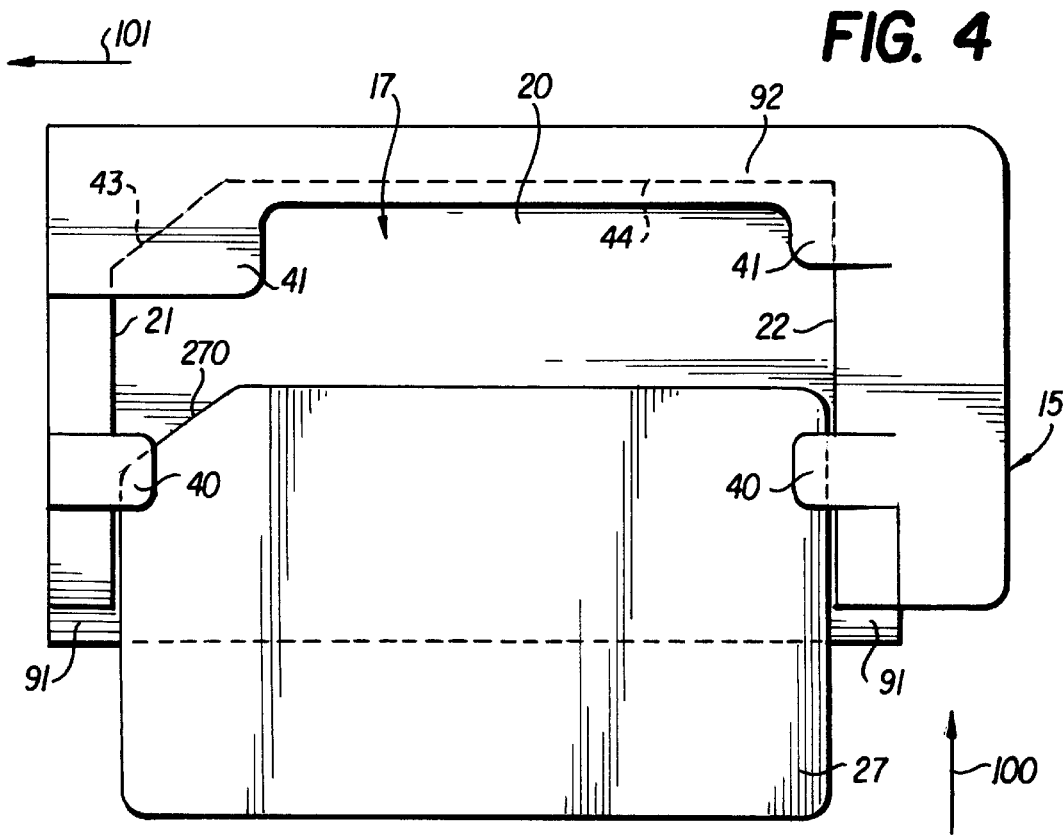
FIG. 4 is a top plan view onto one side, i.e. the top side or upper surface of one pocket of a carrier which forms two pockets (see FIG. 2) for receiving each one SIM-card on a somewhat reduced scale.

The carrier 15 is illustrated in FIGS. 1, 2, and 4 and it can be seen that the cross section of the carrier 15 is asymmetric. This insures that the carrier 15 is inserted in a correct sideways orientation into the contact support 11. Preferably each of the cards 27, 28 is inserted with its transverse or long side into the carrier 15 as will be explained in more detail below.

As may be seen in FIG. 1, the drawer or carrier 15 comprises on both sides, i.e. top and bottom sides a card pocket 17 and 18, respectively, into which the cards 27, 28 may be inserted with their long sides or in a transverse orientation, as mentioned above and shown in FIG. 4 by arrow 100.

FIG. 4 shows a top view of the carrier 15 and also shows the card pocket 17 which is the upper or top card pocket 17 in FIG. 1. Each of the card pockets 17, 18 forms a respective supporting surface 19, 20 for the associated cards 27 and 28. As shown for the (top) card pocket 17, the carrier 15 (which is preferably made from plastic material) has formed thereon inwardly projecting projections 40 and edge projections 41. The projections 40, 41 are disposed in a spaced relationship to the supporting surface 20 so that e.g. the card 27 may be inserted in-between the supporting surface 20 and the lower or bottom surfaces of the projections 40, 41 (shown in FIG. 4) until the card 27 abuts at an abutment or stop surface 44 of the card pocket 17. Lateral guiding is achieved by oppositely located abutment or guide surfaces 21, 22. Respective guide surfaces 23, 24 (see FIG. 1) are also provided on the card pocket 18.

The already mentioned asymmetric form of the carrier 15 is also well depicted in FIGS. 2 and 4. The guidance for the carrier 15 is on the one hand, conveniently achieved by a plate or panel portion 90 which forms the supporting surfaces 19, 20. In particular, the guidance is achieved by a front in FIG. 4) section 91 of the panel portion 90. On the other hand the guidance of the carrier 15 is effected by a broadening or broad portion 92 of the panel portion 90 which is guided in a guiding recess 96 of the connector 10, i.e. the contact support 11. The front section 91 (see also FIG. 2) is received in an accordingly sized guiding recess 95 of the contact support 11.

Preferably, under or below one of the edge projections 41 an inclined surface or chamfer 43 is formed serving as a stop for the chamfer 270 of card 27 thus insuring the correct orientation of the card 27.

As shown in FIG. 1, the contact springs 30 in the top portion 12 are connected by means of connection arms 35 to contact terminals 33. Said contact terminals 33 are located at the same level as contact terminals 34 of the contact springs 31 of the bottom portion 13. The contact terminals 33 and 34 are preferably so-called SMT terminals for the connection with, for example, a printed circuit board.

It is further to be noted that the card pocket 18 in the carrier 15 is formed in an analogue manner to the card pocket 17. The card(s) 27, 28 is (are) inserted (as already mentioned) into the carrier 15, i.e. into the card pockets 17, 18 in the direction of arrow 100 in FIG. 4. The carrier 15 itself is—compare FIG. 1—inserted into the card slot 14 in the direction of arrow 101.

With the design in accordance with the invention a reduced height compared to the height of two stacked connectors is achieved since the supporting structure needs to be provided only once.

In addition, when more than two SIM-cards are to be used, it is contemplated that multiple SIM-connectors 10 are disposed or stacked one above the other, whereby the SIM-connectors 10 may be connected with each other e.g. by a snap-in connection. It is understood that the connection arms 35 of such stacked connectors 10 have to extent down to the level of the printed circuit board.

What is claimed is:

1. A SIM-card connector comprising a first portion which supports first contact elements and a second portion which supports second contact elements, the second portion being disposed in a spaced relationship to the first portion, said first portion and said second portion forming a card slot into which two SIM-cards may be inserted in such a manner that one SIM-card faces with its card contacts towards the contact portions of the contact elements of the first portion whereas the other SIM-card faces with its card contacts towards the contact portions of the contact elements of the second portion; and wherein the cards are insertable into the card slot by means of a card carrier.

2. The SIM-card connector as set forth in claim 1, wherein the card carrier has the shape of a drawer forming on both of its sides a respective card pocket.

3. The SIM-card connector as set forth in claim 2, wherein each of said card pockets is provided with a chamfer which serves as a stop for respective card chamfers formed by said cards.

4. The SIM-card connector as set forth in claim 2, wherein each card pocket comprises a supporting surface for the card to be inserted and lateral card guide means formed by projections.

5. The SIM-card connector as set forth in claim 4, wherein the card pockets receive the cards with their long or transverse sides first and the guiding is achieved at the respective short sides of the cards.

6. The SIM-card connector as set forth in claim 1, wherein the carrier comprises an asymmetric guide means to insure its insertion into the connector in the right orientation.

7. A SIM-card connector comprising a housing which forms a card slot, a first group of contact springs in a first portion of the housing including contact portions which project into the card slot, a second group of contact springs in a second portion of the housing including contact portions which project into the card slot in a direction opposite to the direction in which the contact portions of the first group of contact springs project into the card slot, said contact portions of the first group of contact springs are displaced in relation to the contact portions of the contact springs of the second group such that SIM-cards having the same arrangement or pattern of card contacts are adapted to mate or contact with the respective contact portions when the SIM-cards are inserted with respective orientations rotated with respect to each other by 180° about the transverse axis; and wherein the cards are inserted into the card slot by means of a card carrier.

8. The SIM-card connector as set forth in claim 7, wherein the card carrier has the shape of a drawer forming on both of its sides a respective card pocket.

9. The SIM-card connector as set forth in claim 8, wherein each of said card pockets is provided with a chamfer which serves as a stop for respective card chamfers formed by said cards.

10. The SIM-card connector as set forth in claim 8, wherein each card pocket comprises a supporting surface for the card to be inserted and lateral card guide means formed by projections.

11. The SIM-card connector as set forth in claim 10, wherein the card pockets receive the cards with their long or transverse sides first and the guiding is achieved at the respective short sides of the cards.

12. The SIM-card connector as set forth in claim 7, wherein the carrier comprises an asymmetric guide means to insure its insertion into the connector in the right orientation.

13. A smart card connector having a first portion which supports first contact elements and a second portion which supports second contact elements disposed in a spaced relationship to the first portion, said first portion and said second portion forming a card slot into which two smart cards may be inserted in such a manner that one smart card faces with its card contacts towards the contact portions of the contact elements of the first portion whereas the other smart card faces with its card contacts towards the contact portions of the contact elements of the second portion; and wherein the smart cards are inserted into the card slot by means of a card carrier.

14. The smart card connector as set forth in claim 13, wherein the card carrier has the shape of a drawer forming on both of its sides a respective card pocket.

15. The smart card connector as set forth in claim 14, wherein each of said card pockets is provided with a chamfer which serves as a stop for respective card chamfers formed by said smart cards.

16. The smart card connector as set forth in claim 14, wherein each card pocket comprises a supporting surface for the smart card to be inserted and lateral card guide means formed by projections.

17. The smart card connector as set forth in claim 16, wherein the card pockets receive the cards with their long or transverse sides first and the guiding is achieved at the respective short sides of the smart cards.

18. Smart card connector as set forth in claim 13, wherein the carrier comprises an asymmetric guide means to insure its insertion into the connector in the right orientation.

* * * * *